United States Patent Office 2,708,186
Patented May 10, 1955

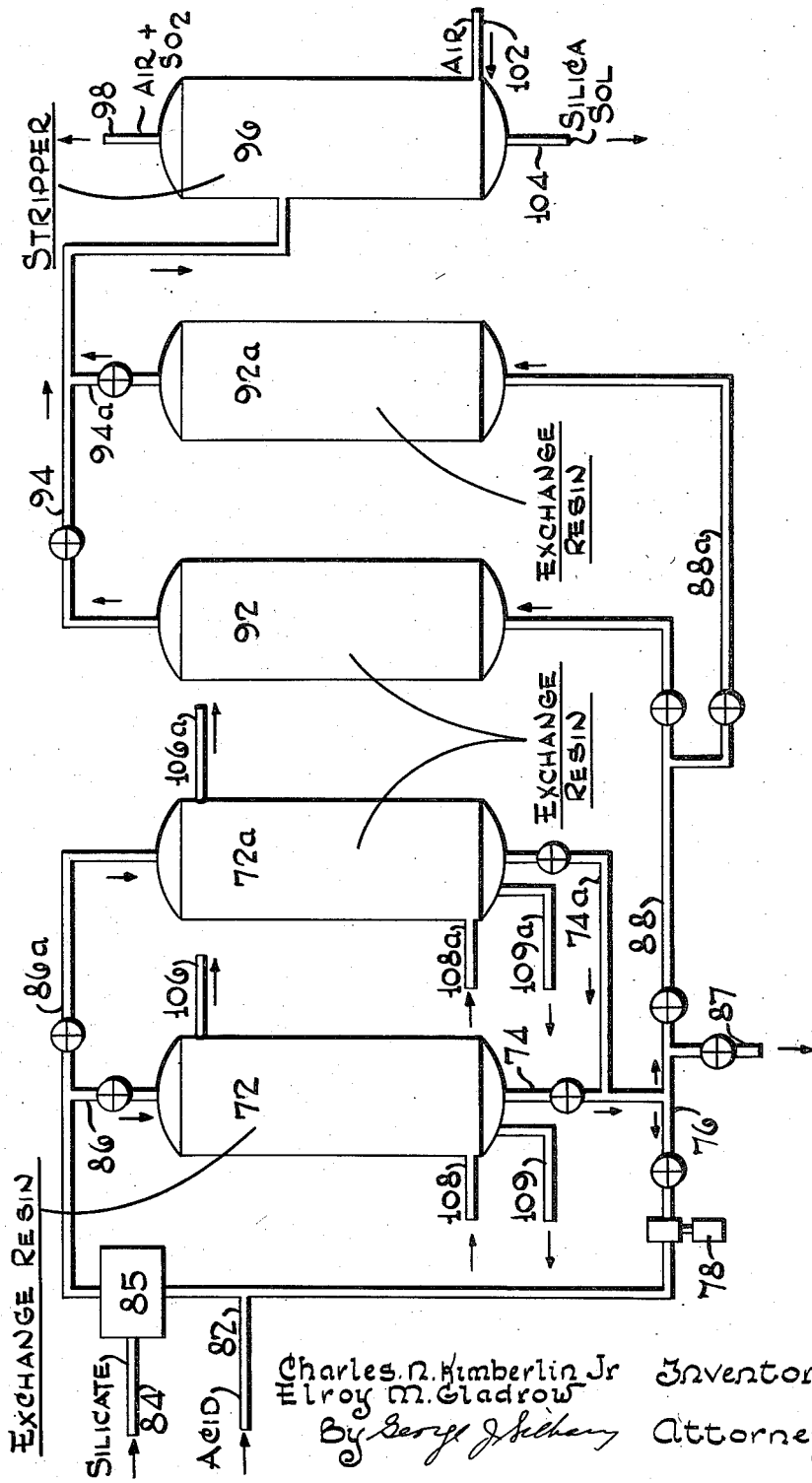

2,708,186
PROCESSES FOR THE MANUFACTURE OF SILICA HYDROSOLS

Charles N. Kimberlin, Jr., and Elroy M. Gladrow, Baton Rouge, La., assignors to Esso Research and Engineering Company, a corporation of Delaware Application August 15, 1951, Serial No. 241,952

6 Claims. (Cl. 252—313)

This invention relates to an improved process for the preparation of substantially pure hydrosols by using cation exchange materials.

It is known to produce silica hydrosols by passing dilute sodium silicate solutions in contact with ion exchange materials. In the prior art processes the useful life of the ion exchange material is reduced after some use, particularly when producing hydrosols above about 3% silica content. In some cases there may be a deposition of silica gel in or on the surfaces of the exchange material and this results in a loss of exchange capacity and/or exchange rate.

The rate of polymerization of silica is influenced to a great extent by the pH of the environment. In particular, the polymerization of silica is very fast in the pH region of about 5 to 8.5. Now in the prior process where alkaline sodium silicate solution is percolated through an acid regenerated cation exchange resin to produce an acidic silica hydrosol, it is believed that the liquid material passes rather slowly through this critical pH region in which the polymerization of silica is rapid. It is believed that this is one of the reasons for the deposition of silica on the exchange resin and the loss of exchange capacity when producing higher concentration silica hydrosols of above about 3% silica content by the prior art process. The prior art process is able to circumvent this polymerization difficulty only by operating with very low concentrations of silica such as below about 30 grams per liter. The present invention avoids this difficulty by passing rapidly through this critical pH region in a separate mixing zone outside of the resin bed.

According to the present invention the dilute sodium silicate is mixed in the absence of cation exchange material with an acid to form a silica hydrosol and the entire acid treated mixture containing the silica hydrosol is contacted with a cation exchange material to remove soda or sodium ions and to produce a higher concentration of substantially pure silica hydrosol than has been heretofore possible without depositing silica gel on the exchange material.

Silica deposition on the exchange resin or other exchange material in the manufacture of higher concentration silica hydrosols is avoided in the present invention by first actually forming the hydrosol in the absence of the cation exchange material by mixing sodium silicate with an acid. In this manner the pH of the siliceous material in subsequent contact with the resin or other exchange material can at all times be below the critical pH range where rapid polymerization of silica may occur. One of the preferred acids is sulfurous acid, or sulfur dioxide which was selected because it has about the desired degree of acidity and it can be removed from the finished silica hydrosol and recovered for reuse. However, other acids may be used.

Generally according to this invention substantially pure silica hydrosols are made by mixing sodium silicate or other alkali metal silicate with an excess of acid such as sulfurous acid or other acid to form a silica hydrosol containing an excess of acid as well as sodium sulfite and/or bisulfite when sulfurous acid is used. The entire acid treated mixture containing the silica hydrosol is then contacted with or percolated through an acid regenerated cation exchange resin or other exchange material in order to effect essentially complete removal of the sodium or other alkali metal ion. In the resin contacting zone the sodium sulfite is decomposed by absorption of the sodium by the resin and liberation of the sulfurous acid to produce an acid silica hydrosol containing only sulfurous acid.

More particularly according to this invention only a small amount of an acid such as sulfur dioxide or sulfurous acid or other acid is used and no separate sulfur dioxide or other acid recovery system is necessary. In the process of this invention, a small amount of sodium silicate solution and only a small fraction of the acid are mixed with a recycle silica hydrosol solution and the mixture passed through a cation exchange column. The quantity of make-up acid added to the system is only a small fraction of the amount stoichiometrically equivalent to the sodium silicate since acid is regenerated from sodium sulfite (or other sodium salt) and used over again after each pass through the resin or other exchange material bed. The effluent from the resin bed containing silica hydrosol and sulfurous acid or other regenerated acid is withdrawn in two streams, the larger stream being recycled to the cation exchange material zone as above described and the second smaller stream comprising silica hydrosol is withdrawn from the system. The larger stream recycled to the cation exchange material zone contains sulfurous acid or other acid and there is added to the large recycle stream additional $SO_2$ or other acid and a small stream of sodium silicate solution. Sulfurous acid or other added acid is regenerated in passing through the cation exchange resin or other exchange material zone and therefore it is not necessary to use a large amount of acid in this process.

If the acid used is sulfurous acid, the reactions involved are illustrated as follows:

(1) $Na_2O \cdot xSiO_2 + (2+y)H_2SO_3 \rightarrow$
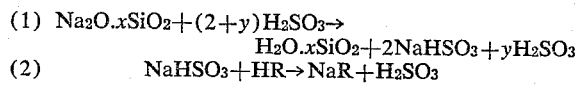
$H_2O \cdot xSiO_2 + 2NaHSO_3 + yH_2SO_3$ (2) $NaHSO_3 + HR \rightarrow NaR + H_2SO_3$ where HR represents the acid form of the resin and NaR represents the corresponding sodium form. The regenerated acid, therefore, remains in the silica hydrosol and the silica hydrosol can be recycled with the addition of more sodium silicate solution and a small amount of acid to maintain the proper acidity.

Equation 1 above shows an excess of sulfurous acid over that required to exactly neutralize the sodium of the sodium silicate. This excess of acid is employed in order to insure that the pH of the mixture is below the critical pH region where silica polymerization is rapid. In making calculations of the amount of sulfurous acid to employ with a given amount of sodium silicate the sulfurous acid should be considered as a monobasic acid. For example, in converting sodium silicate having the soda to silica ratio indicated by the formula

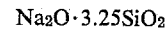
$Na_2O \cdot 3.25SiO_2$ to silica hydrosol by means of sulfurous acid, the sulfurous acid requirement amounts to about 0.7 lb. of sulfur dioxide per pound of silica when not taking advantage of the acid economies provided by the present invention. However, by operating in accordance with the present invention with recycle of the hydrosol through a bed of ion exchange material for regeneration of the acid and back to the mixing zone for reuse of the acid the total acid requirement may be reduced to only about 0.03 to 0.4 lb. of sulfur dioxide per pound of silica, depending upon the recycle ratio employed.

If desired, the withdrawn stream of silica hydrosol may be passed through a second cation exchange material zone and the effluent from the second exchange resin zone may be passed to a stripping zone where any small residual amount of sulfur dioxide is removed and a finished substantially pure silica hydrosol may be withdrawn from the bottom of the stripper.

In the process of this invention, it is essential that the mixture of sodium silicate solution and acid be on the acid side and that there is an excess of acid present above that required for neutralization of the sodium silicate. Preferably the pH of the mixture of acid and sodium silicate solution should be between about 2 and 5, preferably below 4.

The figure represents one form of apparatus adapted to carry out one form of the present invention. In the discussion of the drawing it will be assumed that sulfurous acid is the acid employed to react with sodium silicate to form an acid silica hydrosol which is then treated with an acid regenerated cation exchange resin and recycled. However, it is to be understood that other acids may be employed.

Referring now to the drawing the reference character 72 designates a vessel containing a granular cation exchange resin or other exchange material through which a silica hydrosol containing sodium sulfite and/or bisulfite and an excess of free sulfurous acid is passed. The effluent from the exchange vessel or zone 72 contains an acid solution of silica hydrosol containing free sulfurous acid and is withdrawn through line 74. A large portion of this withdrawn stream (which may be 50% to 96% or more of the total) is recycled through line 76 by pump 78 to vessel 72 and to this recycle stream is added a very small amount of an acid such as sulfurous acid, sulfur dioxide or the like through line 82 and a small amount of sodium silicate solution through line 84. At or near the point of introduction of the sodium silicate solution there is a mixing zone 85 for the rapid and efficient mixing of the alkaline sodium silicate with the recycled acid silica hydrosol containing the make-up acid added by line 82. This mixing zone may comprise any efficient mixing device for the rapid mixing of two liquids such as a two-fluid mixing nozzle or a venturi orifice or other like device.

The amount of make up acid added to the system by line 82 is just enough to replace that withdrawn with hydrosol by line 87 or 88 as hereinafter described. This amount will, of course, depend upon the recycle ratio at which the system is operated, i. e., the ratio of the recycle flow rate in line 76 to the withdrawal flow rate in line 87 or 88. This recycle flow ratio may be between about 25 to 1 and 1 to 1. For example, when using a recycle ratio of about 25 to 1 each increment of make up acid added by line 82 will, on the average, be used for neutralizing sodium silicate in mixing zone 85 and regenerated in exchange zone 72 about twenty-five times; thus, when making allowances for maintaining at all times an excess of acid in mixing zone 85, the amount of make up acid added by line 82 need be only about one-twentieth of that which would be calculated as stoichiometrically the equivalent of the sodium silicate added by line 84, or only about 0.033 lb. of sulfur dioxide per pound of silica when using a sodium silicate of the composition $Na_2O \cdot 3.25SiO_2$. In like manner when using a recycle ratio of about 12 to 1 the amount of make up acid added by line 82 may be only about one-tenth the stoichiometric equivalent of the sodium silicate added by line 84, or only about 0.066 lb. of sulfur dioxide per pound of silica when employing sodium silicate of composition $$Na_2O \cdot 3.25SiO_2$$

The make up sulfurous acid may be added by line 82 in the form of anhydrous liquid or gaseous sulfur dioxide or as an aqueous solution. The amount of sodium silicate solution added by line 84 should be somewhat less than the stoichiometric equivalent of the total free acid contained in the recycle stream in line 76 plus the make up acid introduced by line 82. About 80 to 95% of the stoichiometric equivalence of sodium silicate is satisfactory. The rate of addition of the sodium silicate may be conveniently controlled and regulated by instrumental means actuated by the pH of the mixture in line 86 between the mixing zone 85 and exchange zone 72. The pH of this mixture in line 86 should be maintained between about 2 and 5, preferably below about 4. The concentration of the sodium silicate solution introduced by line 84 is chosen to give the desired concentration of silica hydrosol as a product. Thus if the make up acid introduced by line 82 is anhydrous sulfur dioxide, the sodium silicate solution introduced by line 84 should contain approximately the same concentration of silica as is desired in the finished hydrosol or only a slightly higher concentration to compensate for a slight amount of dilution due to wash water remaining on the ion exchange resin as will be explained hereinafter. If the acid introduced by line 82 is an aqueous acid, the concentration of the sodium silicate should be correspondingly higher to compensate for the water introduced with the acid. However, it is preferred that the concentration of the sodium silicate not be above about 260 grams of silica per liter and that the concentration of the silica hydrosol in line 86 not be above about 150 grams of silica per liter.

The mixture of sufurous acid or other acid and sodium silicate forms an acid silica hydrosol containing sodium sulfite or sodium salt of the acid used and excess free acid. This mixture is then introduced through line 86 into the top of the exchange vessel or zone 72 containing a substantially stationary bed of granular cation exchange material and in passing down through the stationary bed of granular acid regenerated cation exchange material, sodium ions are removed by the exchange material and free sulfurous acid is formed by decomposition of the sodium sulfite or other sodium salt formed. In this way by recycling a large proportion of the stream through line 76, only small amounts of sulfur dioxide or other acid are necessary to maintain the exchange reaction or cycle on the acid side during the exchange step. Exchange zone 72 may be operated upflow in place of downflow if desired.

At the start up of operations when no hydrosol is available for recycling the procedure is somewhat different from that described above for operation after equilibrium has been established. For starting up, a small amount of water, for example 0.1 volume of water per volume of exchange resin, may be introduced into exchange zone 72 by line 108 and circulation through lines 74, 76 and 86 established by means of pump 78. Acid is introduced by line 82 till the acid concentration in the circulating water stream becomes the same as that in the circulating hydrosol stream during normal operation. The introduction of sodium silicate solution into mixing zone 85 by line 84 is then commenced and the operations are continued as above described. If desired, the concentration of the sodium silicate introduced during this initial starting up period may be somewhat higher than that introduced during normal operation in order to compensate for the diluting effect of the water used for starting up.

After the exchanger has been used for some time the exchange capacity or ability to remove soda with the regeneration of acid in the hydrosol decreases due to the accumulation of sodium ions thereon and it is necessary to regenerate the exchange resin. It is necessary to regenerate before the free acid content of the recycle stream in line 76 decreases below the amount needed to supply an excess of acid for neutralizing the sodium silicate introduced into mixing zone 85 by line 84. As the free acid content of the effluent decreases the soda content increases and may be allowed to rise as high as about 1 wt. percent soda on a dry basis before regeneration if desired; however, it is preferred to regenerate before the soda content of the effluent rises to as high as about 0.5 wt. percent on a dry basis. The time for regeneration may be determined by various instrumental means which depend upon the pH, electrical conductivity, or other property of the hydrosol effluent from the exchange zone.

However, for practical purposes it is preferred to predetermine the capacity of the particular exchange resin being used for soda removal and acid regeneration. This is best done in a small experimental exchange resin bed to which is fed silica hydrosol having a composition the same as that in line 86. The effluent from the experimental bed is collected in increments which are separately analyzed for free acid and soda. The data thus collected may be used to calculate the total volume of sodium silicate that may be converted into hydrosol and processed in exchange resin bed 72 per exchange step to avoid exceeding the desired maximum soda content of the effluent in line 74. Usually about 10% less than this volume is processed per exchange step in order to allow a reasonable safety factor. This volume of material that can be processed in exchange zone 72 per exchange step is, of course, dependent upon several factors such as (1) the nature or exchange capacity of the particular exchange resin being employed, (2) the concentration of the particular silica hydrosol being processed, and (3) the soda to silica ratio in the sodium silicate entering the process by line 84.

After the exchange capacity of the resin in zone 72 has been substantially exhausted the hydrosol remaining in the resin bed may be transferred via lines 74, 76 86a and pump 78 to exchange zone 72a containing exchange resin which has been freshly regenerated with acid, washed with water, and drained by line 109a. Zone 72a is similar to zone 72; any desired number of such zones may be employed in order to maintain continuity of operations. After the transfer of hydrosol from zone 72 to zone 72a, circulation is established through lines 74a, 76 and 86a and the operation above described continues with exchange zone 72a in the circuit in place of zone 72. During the transfer of hydrosol from zone 72 to zone 72a it is not necessary to stop the flow of make up acid in line 82 or of sodium silicate solution in line 84 so that the process is continuous with respect to the production of silica hydrosol.

After removal of the hydrosol from exchange zone 72 the resin bed is rinsed with water preparatory to regeneration of the bed with an acid. For this purpose 1 to 2 volumes of water per volume of exchange resin are introduced into zone 72 by line 108 and passed through the resin bed, preferably up-flow. The rinse water leaves exchange zone 72 by line 106. The exchange resin bed is then regenerated with an acid such as sulfuric acid or hydrochloric acid to replace the alkali metal ions on the resin with hydrogen ions from the acid with the formation of sodium sulfate or sodium chloride depending on the acid used in the regeneration. The regenerating acid may be introduced by line 108 and the spent acid containing sodium salts may be withdrawn from the system by line 106. The regenerating acid may be conveniently used in the form of a solution having a concentration of 5 to 10%. The amount of regenerating used in the regeneration step may be related to the amount of soda removed from the hydrosol during the exchange step. In general a considerable excess of regenerating acid over that stoichiometrically equivalent to the soda is required in order to obtain efficient regeneration; thus the total amount of acid used in the regeneration step may be 125% to 200% of the stoichiometric equivalent of the soda deposited upon the resin during the exchange step.

After regeneration the bed of exchange material is washed free of sulfate ion or chloride ion depending on the type of acid used. Two to five volumes of water per volume of resin may be used for this wash. Upon completion of the washing the remaining wash water is drained from the resin bed by line 109; the cation exchange material is then ready for further use in the exchange step.

The other and small portion of the effluent withdrawn from the exchange resin zone 72 through line 74 is withdrawn as silica hydrosol through line 87 and passed to storage or treated as desired. In the case of high recycle ratio operation this portion may amount to as little as 4% or less of the total effluent from zone 72 through line 74, or in the case of very low recycle ratio operation this portion may amount to as much as 50% of the effluent from zone 72. The hydrosol withdrawn by line 87 contains free sulfurous or other acid. The amount of acid contained in the hydrosol ranges from about 0.03 to 0.4 lb. of $SO_2$ per lb. of $SiO_2$ and is determined by the relative rates of flow of make-up acid in line 82 and of sodium silicate in line 84, which in turn is determined by the recycle ratio at which the system is operated as was explained above; the higher the recycle ratio, the smaller the amount of free acid in the hydrosol withdrawn by line 87. Since the recycle type of operation employed in exchange zone 72 is not extremely efficient for soda clean-up, the hydrosol will also contain some soda. The amount of soda present may be as much as 0.5 wt. per cent (dry basis), but will generally be less than about 0.2 wt. per cent on a dry basis. For many purposes such as for the sizing of paper or the preparation of certain adsorptive gels these impurities in the hydrosol withdrawn by line 87 may not be objectionable.

For certain other uses such as for the preparation of certain catalysts the presence of sulfurous acid in the silica hydrosol may be undesirable, whereas the presence of another acid such as acetic acid would not be objectionable; in such case it is preferred to introduce the less objectionable acid into the process by line 82 in place of sulfurous acid. However, for certain other purposes it may be desired to obtain an especially purified silica hydrosol free of substantially all soda and excess acid. In this case the hydrosol may be further treated for the removal of these impurities. For this purpose, if desired, the silica hydrosol may be passed through line 88 to a second cation exchange resin or other exchange material zone 92 where there is an additional clean up of the sodium ion so that the effluent from the cation exchange zone 92 passing through line 94 contains substantially pure silica hydrosol with only a small amount of sulfur dioxide. The effluent from line 94 is passed into the upper portion of a stripping zone 96 where any remaining sulfur dioxide is stripped from the silica hydrosol and is taken out overhead through line 98. The air or other gas for stripping such as natural gas is introduced into the lower portion of the stripping tower 96 through line 102. The finished substantially pure silica hydrosol is withdrawn from the bottom of the stripping tower 96 through line 104.

The gas passing overhead through line 98 from the stripping tower 96 may be scrubbed with water to recover any traces of sulfur dioxide and this solution may be recycled to line 82 for reuse in the process, if desired. In place of water scrubbing solid adsorbents may be used for $SO_2$ recovery, if desired.

Due to the low soda content of the hydrosol treated in exchange zone 92 the regenerations of the resin bed may be less frequent than in the case of the resin bed in zone 72. The capacity of the resin in zone 92 may be pre-determined in small experimental equipment as was described for exchange zone 72. After the resin bed in zone 92 has been used for processing sufficient hydrosol to substantially exhaust its exchange capacity, the flow of hydrosol is diverted by lines 88a and 94a through exchange zone 92a which is similar to zone 92, and the resin in zone 92 is regenerated with acid in a manner similar to that described above for the regeneration of the resin bed in zone 72. Due to the long exchange periods realizable with exchanges zones 92 and 92a ample time is available for the regeneration of one resin bed while the other is being used in the exchange step, thus only two such zones are generally required for the continuous production of hydrosol.

As the exchange material there is preferably used a resin of the acid regenerated cation type. Such cation exchange resins are available as commercial products. The exchange resins are obtained by condensing aldehydes such as formaldehyde with phenol or certain phenol-sulfonic acids or the like. Other exchange materials which may be used are sulfuric acid treated coal or wood or waste petroleum sludge or lignite or the like. Also the sulfonated polystyrene type exchange resin may be used. These exchange materials are treated with an acid such as sulfuric acid or hydrochloric acid to put them in the hydrogen cycle for use in removing cations or sodium ions in this particular case. Exchange resins of this type are sold by Resinous Products and Chemical Company under the name of Amberlite.

The concentration of sodium silicate solution should be such that there are not more than about 260 grams of $SiO_2$ per liter and preferably not more than about 200 grams of $SiO_2$ per liter. After mixing of the sodium silicate solution with the recycled acid hydrosol stream the concentration of the mixture should preferably be such that there are not more than about 150 grams of silica per liter of the acidic mixture. The rate of flow of the hydrosol solution through the bed of exchange material in vessel 72 may vary between about 0.5 to 5 gallons per minute per cubic foot of resin, preferably about 1 gallon per minute per cubic foot of resin. The rate of flow of the hydrosol through the bed of exchange material in vessel 92 may vary between about 0.1 to 1 gallon per minute per cubic foot of resin, preferably about 0.35 gallon per minute per cubic foot of resin. The rate of flow will depend somewhat upon the particular exchange material employed since some of the available resins permit more rapid exchange than others.

Instead of using sulfurous acid or sulfur dioxide we may use other volatile acids which can be distilled overhead from an aqueous solution. Also we may use acids such as acetic acid, propionic acid, butyric acid or chloroacetic acid which may be recovered from the acid silica hydrosol by solvent extraction or with a solvent such as chloroform or a hydrocarbon oil or which may be allowed to remain in the hydrosol without impairing its usefulness.

Instead of using sodium silicate solution as a starting feed, an alkaline silica hydrosol may be used as feed through line 84.

The silica hydrosol withdrawn at 87 or 104 may be allowed to gel and the silica gel may be used as such without water washing or the silica hydrosol may be mixed with alumina hydrosol in the preparation of catalysts such as cracking catalysts. The silica hydrosol and alumina hydrosol may be mixed in any desired proportion with 10 to 90% of silica and the rest alumina and the resulting hydrosol mixture may be gelled and dried or spray dried to form spherical particles. The catalyst may be in the form of granules, powder or spherical particles.

By maintaining the hydrosol solution acid during the cation exchange step according to this invention, it is possible to obtain a substantially pure silica hydrosol containing up to about 15% $SiO_2$ by weight and less than about 0.5 wt. percent (dry basis) of $Na_2O$ without the use of a clean-up resin bed such as exchange zone 92 or less than about 0.01 wt. percent (dry basis) of $Na_2O$ when employing a clean-up resin bed, without fouling of the exchange material with silica gel.

Instead of using a fixed bed of cation exchange material, the granular or other form exchange material may be mixed with the solution to be treated as a slurry in a stirred mixer or agitator type vessel.

The invention will be illustrated by the following specific example for the production of a silica hydrosol having a concentration of approximately 100 grams of silica per liter. Into vessel 72 is placed IR–120 Amberlite resin obtained from the Resinous Products and Chemical Company. The total volume of the resin bed is 1000 volumes of which about 40% or 400 volumes is void space between the resin particles. Since the resin as purchased is in the sodium form, it is first regenerated by treatment with about 4000 volumes of 5% sulfuric acid followed by washing with water using about 5000 volumes of water for this purpose. The final wash water is drained from the vessel and the resin bed is now ready for use in making hydrosol. Into vessel 72 are introduced 100 volumes of sulfurous acid solution containing about 25.5 grams of sulfur dioxide per liter and circulation is established through lines 74, 76 and 86 by means of pump 78. The circulation rate at the beginning of the operation is about 50 volumes per minute.

After circulation is established the introduction of sodium silicate solution is commenced. Sodium silicate ($Na_2O \cdot 3.25\ SiO_2$) of Sp. Gr. 1.14 is introduced by line 84 at a flow rate of about 6 volumes per minute. The circulation rate of flow in line 76 is gradually increased during the course of about 44 minutes to about 100 volumes per minute which is the desired rate of circulation for operation. At this time the introduction of make-up sulfurous acid is commenced. Sulfurous acid solution containing about 25.5 grams of $SO_2$ per liter is introduced by line 82 at a flow rate of about 2.27 volumes per minute. After about 10 additional minutes of operation the take-off of hydrosol by line 87 is commenced. At this time the resin bed is slightly more than just covered with hydrosol. The rate of take-off is about 8.27 volumes per minute, or equal to the combined rate of flow of the make-up acid in line 82 and of the sodium silicate solution in line 84. About 3 hours after commencing the introduction of sodium silicate the resin bed is nearing exhaustion. At this time the hydrosol is transferred from vessel 72 to vessel 72a by opening the valve in line 86a and closing the valve in line 86. Vessel 72a contains 1000 volumes of acid regenerated Amberlite IR–120 resin. When the transfer of hydrosol from vessel 72 is nearly complete, circulation is established through vessel 72a by opening the valve in line 74a and closing the valve in line 74. The operation is continued with the resin bed in vessel 72a while the resin in vessel 72 is being regenerated with acid.

During the transfer of hydrosol from vessel 72 to vessel 72a care is taken that at no time is the flow in line 76 interrupted. The hydrosol withdrawn by line 87 contains approximately 100 grams of $SiO_2$ per liter and about 7 grams of $SO_2$ per liter and about 0.2 wt. percent soda on a dry basis. Upon drying the hydrosol there is obtained a silica gel suitable for use as a solid adsorbent for the recovery of vapors or for other adsorption purposes.

What is claimed is:

1. A process for the production of silica hydrosols which comprises first forming an aqueous solution containing silica hydrosol by mixing an alkali metal silicate solution with an excess of acid and an aqueous acid solution containing silica hydrosol so that the resulting mixture has a pH below about 5.0 and contains the alkali metal salt of the acid and excess acid, then passing the resulting mixture through a stationary bed of granular cation exchange material to remove alkali metal ions from the mixture and to regenerate acid from the alkali metal salt of the acid, withdrawing an acid solution containing silica hydrosol from said stationary bed of cation exchange material, removing as a product a minor portion of the withdrawn acid solution containing silica hydrosol, mixing additional acid and alkali metal silicate solution with the major portion of the withdrawn acid solution to replace the acid and silica removed with said silica hydrosol product and to produce a mixture containing additionally formed silica hydrosol and additionally formed alkali metal salt of the acid and having a pH below about 5.0, recycling such last-mentioned mixture comprising the major portion of the withdrawn acid solution containing silica hydrosol for passage through said stationary bed of granular cation exchange material for removing alkali metal ions from such last-mentioned mixture and continuing the recycling step and withdrawal of silica hydrosol product until the cation exchange material is nearly spent.

2. A process according to claim 1 wherein the ratio of the amount of withdrawn silica hydrosol solution recycled to that recovered is between about 25 to 1 and 1 to 1.

3. A process for the production of silica hydrosols which comprises mixing an aqueous acid solution containing silica hydrosol with an alkali metal silicate solution and an excess of sulfurous acid to produce additional silica hydrosol from said alkali metal silicate and the alkali metal salt of sulfurous acid, and so that the resulting mixture contains excess sulfurous acid and has a pH below about 5.0, then passing the resulting mixture through a stationary bed of granular cation exchange material to remove alkali metal ions from the mixture and to regenerate sulfurous acid from the alkali metal salt of sulfurous acid, withdrawing an acid solution containing silica hydrosol from said stationary bed of cation exchange material, removing as a product a minor portion of the withdrawn acid solution containing silica hydrosol, mixing additional sulfurous acid and alkali metal silicate solution with the major portion of the withdrawn acid solution to produce a mixture containing sulfurous acid and additionally formed silica hydrosol and additionally formed alkali metal salt of sulfurous acid and having a pH below about 5.0 the amount of alkali metal silicate solution and sulfurous acid added to said major portion of withdrawn acid solution being substantially equivalent to the sulfurous acid and silica removed with said silica hydrosol product, recycling such last-mentioned mixture comprising the major portion of the withdrawn acid solution containing silica hydrosol for passage through said stationary bed of granular cation exchange material for removing alkali metal ions from said last-mentioned mixture and continuing the process including the recycling step and withdrawal of silica hydrosol product until the cation exchange material is nearing exhaustion.

4. A process according to claim 3 wherein sulfurous acid is recovered from the minor portion of withdrawn acid solution containing silica hydrosol product and used as the sulfurous acid in the process.

5. A process for the production of silica hydrosols which comprises mixing an acid aqueous solution containing silica hydrosol with an alkali metal silicate solution and an excess of acid to produce silica hydrosol from said alkali metal silicate and the alkali metal salt of the acid and so that the resulting mixture contains excess acid and has a pH below about 5.0, then passing the resulting mixture through a stationary bed of granular cation exchange material to remove alkali metal ions from the mixture and to regenerate acid from the alkali metal salt of the acid, withdrawing an acid solution containing silica hydrosol from said stationary bed of cation exchange material, removing as a product a minor portion of the withdrawn acid solution containing silica hydrosol, mixing additional acid and alkali metal silicate solution with the major portion of the withdrawn acid solution to produce a mixture containing excess acid and additionally formed silica hydrosol and additionally formed alkali metal salt of the acid and having a pH below about 5.0 the amount of alkali metal silicate solution and acid added to said major portion of withdrawn acid solution being substantially equivalent to the acid and silica removed with said silica hydrosol product, recycling such last-mentioned mixture comprising the major portion of the withdrawn acid solution containing silica hydrosol for passage through said stationary bed of granular cation exchange material for removing alkali metal ions from such last-mentioned mixture and continuing the process including the recycling of the major portion and withdrawal of silica hydrosol product until the cation exchange material is nearing exhaustion.

6. A process for the production of silica hydrosols which comprises first forming an aqueous solution containing silica hydrosol by mixing an alkali metal silicate solution with an excess of acid and an aqueous acid solution containing silica hydrosol so that the resulting mixture has a pH below about 5.0, then passing the resulting mixture through a stationary bed of granular cation exchange material to remove alkali metal ions from the mixture, withdrawing an acid solution containing silica hydrosol from said stationary bed of granular cation exchange material, removing as product a minor portion of the withdrawn acid solution containing silica hydrosol, mixing additional acid and alkali metal silicate solution with the major portion of the withdrawn acid solution to replace the acid and silica removed with said silica hydrosol product and to produce a mixture containing additionally formed silica hydrosol and having a pH below about 5.0, recycling such last-mentioned mixture comprising the major portion of the withdrawn acid solution for passage through said stationary bed of granular cation exchange material for removing alkali metal ions from such last-mentioned mixture and continuing the recycling step and withdrawal of silica hydrosol product until the cation exchange material is nearly spent.

References Cited in the file of this patent

UNITED STATES PATENTS

| | | |
|---|---|---|
| 2,244,325 | Bird | June 3, 1941 |
| 2,386,810 | Marisic et al. | Oct. 16, 1945 |
| 2,588,389 | Iler | Mar. 11, 1952 |